United States Patent
Sheehy

(10) Patent No.: US 9,366,029 B2
(45) Date of Patent: Jun. 14, 2016

(54) CONCRETE/PLASTIC WALL PANEL AND METHOD OF ASSEMBLING

(71) Applicant: EPI 04, Inc., Tallahassee, FL (US)

(72) Inventor: Gregory R. Sheehy, Reedsville, WI (US)

(73) Assignee: EPI 04, Inc., Tallahassee, FL (US)

( * ) Notice: Subject to any disclaimer, the term of this patent is extended or adjusted under 35 U.S.C. 154(b) by 0 days.

(21) Appl. No.: 14/790,479

(22) Filed: Jul. 2, 2015

(65) Prior Publication Data

US 2015/0354214 A1    Dec. 10, 2015

Related U.S. Application Data

(63) Continuation of application No. 13/625,094, filed on Sep. 24, 2012, now Pat. No. 9,103,120.

(60) Provisional application No. 61/541,152, filed on Sep. 30, 2011.

(51) Int. Cl.

| | |
|---|---|
| *E04C 2/00* | (2006.01) |
| *E04C 2/28* | (2006.01) |
| *B32B 3/06* | (2006.01) |
| *E04C 2/30* | (2006.01) |
| *E04B 2/00* | (2006.01) |
| *B32B 13/12* | (2006.01) |
| *B28B 19/00* | (2006.01) |
| *B32B 3/08* | (2006.01) |
| *E04C 2/26* | (2006.01) |
| *E04C 2/288* | (2006.01) |
| *E04C 2/38* | (2006.01) |
| *E04B 2/86* | (2006.01) |

(52) U.S. Cl.
CPC .............. *E04C 2/28* (2013.01); *B28B 19/0046* (2013.01); *B32B 3/06* (2013.01); *B32B 3/08* (2013.01); *B32B 13/12* (2013.01); *E04C 2/26* (2013.01); *E04C 2/288* (2013.01); *E04C 2/30* (2013.01); *E04C 2/38* (2013.01); *E04C 2/46* (2013.01); *B32B 2607/00* (2013.01); *E04B 2002/8688* (2013.01); *E04B 2002/8694* (2013.01); *E04C 2002/001* (2013.01); *Y10T 428/24174* (2015.01)

(58) Field of Classification Search
CPC ................ E04B 2002/8688; E04B 2002/8694; E04B 2/8629; E04C 2/26; E04C 2/28; E04C 2/30; E04C 2/38; E04C 2/46; E04C 2/288; B32B 3/06; B32B 3/08; Y10T 428/24174
USPC ........... 52/421, 425, 426, 429, 439, 562, 563, 52/588.1
See application file for complete search history.

(56) References Cited

U.S. PATENT DOCUMENTS

| | | |
|---|---|---|
| 5,636,481 A | 6/1997 | De Zen |
| 5,706,620 A | 1/1998 | De Zen |
| 6,189,269 B1 | 2/2001 | De Zen |
| 6,247,280 B1 | 6/2001 | Grinshpun et al. |
| 7,444,788 B2 | 11/2008 | Morin et al. |
| 7,559,176 B2 | 7/2009 | Foell et al. |
| 7,818,936 B2 | 10/2010 | Morin et al. |
| 8,793,953 B2 | 8/2014 | Richardson et al. |
| 2010/0071304 A1 | 3/2010 | Richardson et al. |

*Primary Examiner* — James Buckle, Jr.
(74) *Attorney, Agent, or Firm* — Andrus Intellectual Property Law, LLP

(57) ABSTRACT

A method for forming a variably sized wall panel by supplying a face panel of a first material, the face panel having a front face and a back face, the back face having a plurality of crosspieces extending therefrom. The face panel is placed in a mold such that the front face of the face panel abuts a bottom of the mold and the back face of the face panel faces away from the bottom of the mold. A flowable second material is layered on top of the face panel and the flowable second material is allowed to harden such that the back face of the face panel and the crosspieces are frictionally bound to the hardened second material.

6 Claims, 5 Drawing Sheets

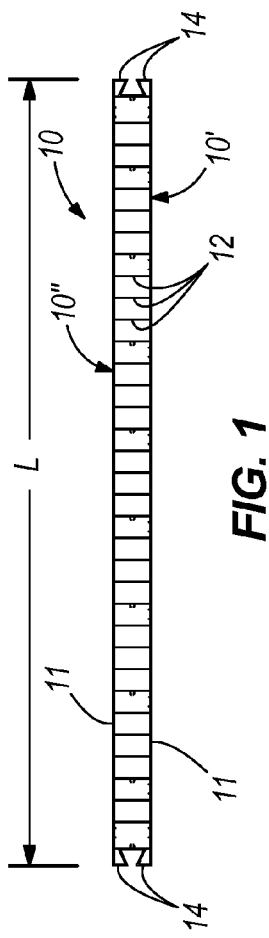
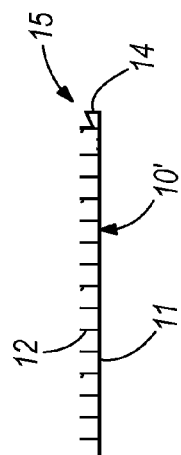
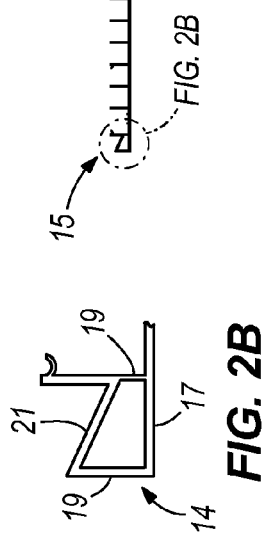
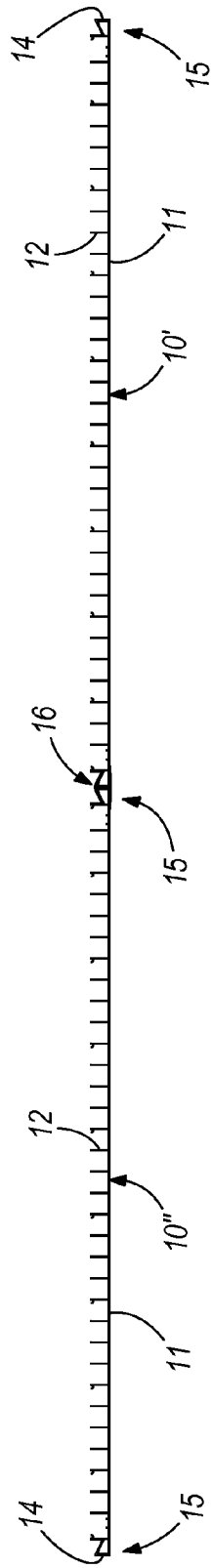

CONCRETE/PLASTIC WALL PANEL AND METHOD OF ASSEMBLING

CROSS REFERENCE TO RELATED APPLICATION

This application is a continuation of U.S. patent application Ser. No. 13/625,094, filed on Sep. 24, 2012, which application claims priority to U.S. Provisional Patent Application Ser. No. 61/541,152, filed on Sep. 30, 2011.

FIELD

The present disclosure relates to portable wall panels that can be formed at one location and transported to another for assembly into a structure.

SUMMARY

This disclosure describes several embodiments of a combination concrete and plastic wall panel. The wall panel can be used in tilt-up wall construction. The wall panel can be used for construction in various fields and applications, for example in the fields of agriculture, food processing, and car and truck washes. The wall panel is particularly desirable for use in buildings where moisture is prevalent and sanitation is important. A plastic face panel that limns one surface of the wall panel provides a surface that can be washed and sanitized while the concrete married to the plastic face panel provides the required strength and durability.

The plastic face panel is married to the concrete to form one unit. The combination concrete and plastic wall panels may be trucked to a job site and set in place by a crane. Two or more pre-formed wall panels may be set side-by-side with an expansion joint between them.

A method for forming a variably sized wall panel is disclosed. The method comprises supplying a face panel of a first material, the face panel having a front face and a back face, the back face having a plurality of crosspieces extending therefrom. The method further comprises placing the face panel in a mold such that the front face of the face panel abuts a bottom surface of the mold and the back face of the face panel faces away from the bottom surface of the mold. The method further comprises layering a flowable second material on top of the face panel and allowing the flowable second material to harden such that the back face of the face panel and the crosspieces are frictionally bound to the hardened second material.

A method for forming a composite wall panel is also disclosed. The method comprises providing a first plastic face panel, the plastic face panel having a front flux and a back face. The method further comprises pouring a layer of concrete on top of and coextensive with the back face of the plastic face panel. The back face of the face panel has a plurality of crosspieces extending therefrom which, upon drying, bond the concrete to the plastic face panel by frictional engagement with the plurality of crosspieces.

A composite wall panel is also disclosed. The wall panel comprises a first plastic face panel, the plastic face panel having a front face and a back face. The wall panel further comprises a layer of concrete bonded to and coextensive with the back face of the first plastic face panel. The back face of the first plastic face panel has a plurality of crosspieces extending therefrom and the concrete is bonded to the first plastic face panel by frictional engagement with the plurality of crosspieces.

Various other features, objects, and advantages of the disclosure will be made apparent from the following description taken together with the drawings.

BRIEF DESCRIPTION OF THE DRAWINGS

The drawings illustrate the best mode presently contemplated of carrying out the disclosure. In the drawings:

FIG. 1 depicts an extruded plastic structural member that includes a pair of plastic face panels;

FIG. 2A depicts one of the extruded plastic face panels of FIG. 1;

FIG. 2B is a magnified view of one end of the extruded plastic face panel shown in FIG. 2A;

FIG. 3 depicts the two face panels of the extruded plastic member of FIG. 1 lined up end-to-end and joined by a splice cap;

DETAILED DESCRIPTION

Figure 4:
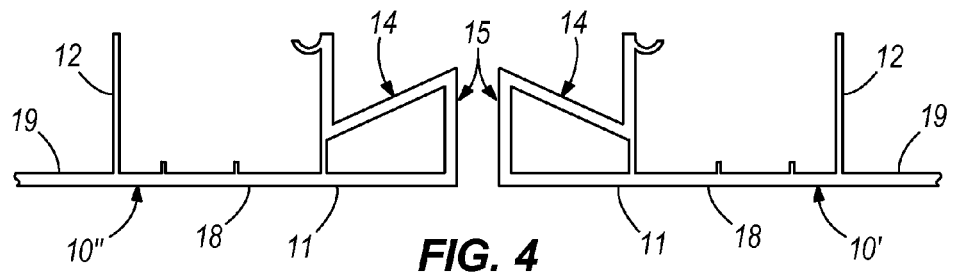
FIG. 4 depicts a close-up of a protrusion on the end of a pair of adjoining plastic face panels.

FIG. 1 shows an extruded plastic structural member 10 that includes two face panels 10' and 10''' joined to each other. The two face panels 10' and 10'' each include an outer wall 11. The pair of spaced outer walls 11 are connected to each other by a plurality of crosspieces 12. The structural member 10 of FIG. 1 is extruded plastic; however, other methods of forming and other materials for forming the structural member 10 are contemplated. At each side edge 15 of the member 10 there are one or more protrusions 14. In the example shown, the protrusions 14 take the shape of a right trapezoid. (See FIG. 2B.) However, the protrusions 14 at the side edges 15 of the member 10 could take any other irregular shape that would allow for a splice cap to connect two face panels 10', 10'' of the structural member 10, as described further herein below.

In FIG. 2, the extruded plastic structural member 10 is shown cut in half such that the two face panels 10', 10'' are separated from one another. In the example of FIG. 2, only the first face panel 10' is shown; however, the second 10'' is substantially identical to the first face panel 10'. The first face panel 10' is separated from the second face panel 10'' by cutting through the crosspieces 12 along the length "L" of the structural member 10. Cutting through the crosspieces 12 can be accomplished in many ways, such as with a band saw, a laser, or any other technique known to one of skill in the art. Alternatively, the two face panels 10', 10'' could be extruded separately from one another, which would eliminate the need for the step of cutting the structural member 10. The face panels 10', 10" are separated (or extruded separately) such that each face panel has a protrusion 14 on both of its side edges.

As shown in FIG. 3, after the two face panels 10', 10" are separated from one another, the face panels can be aligned such that side edges 15 of each face panel 10', 10" are adjacent one another. The face panels 10', 10" are then connected at one of their side edges 15 with a splice cap 16. (A close-up of the splice cap is shown in FIG. 7.) The splice cap 16 is configured to fit around the protrusion 14 on each face panel 10', 10", as described with reference to FIGS. 4-7. Although two face panels 10' and 10" are shown positioned in a side-to-side relationship in FIG. 3, additional face panels could be used to extend the length of the section shown in FIG. 3.

Figure 5:
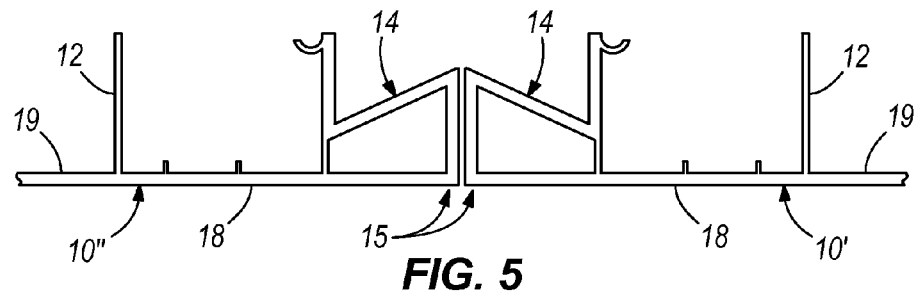
FIG. 5 depicts two protrusions aligned with one another.

FIG. 4 shows a close-up of the side edges 15 of face panels 10', 10". Although face panel 10' is shown on the right side and face panel 10" is shown on the left, the face panels could be oppositely switched, or completely different face panels could be aligned with either face panel 10' or 10" due to the fact that the face panels 10', 10" are substantially identical. Protrusions 14 are placed adjacent, to one another such that the front face 18 of the outer wall 11 of each face panel 10', 10" lies in substantially the same plane. The two face panels 10', 10" are brought together such that the protrusions 14 are closely spaced, with enough space for a splice cap 16 to be inserted between the face panels 10', 10". This alignment is shown in FIG. 5.

Figure 6:
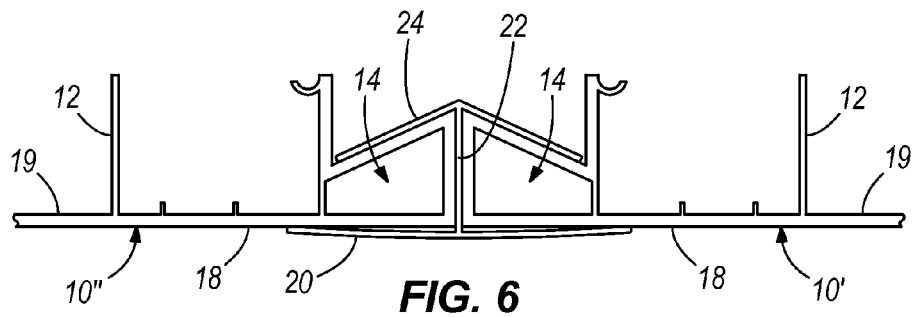
FIG. 6 depicts two protrusions joined by a splice cap.
Figure 7:
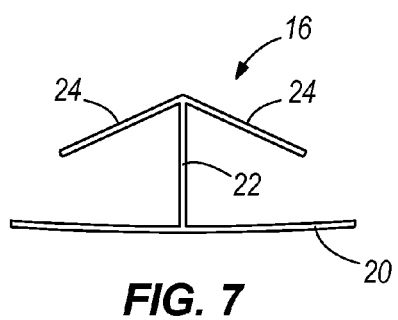
FIG. 7 depicts a close-up of the splice cap of FIG. 6.

As shown in FIG. 6, the splice cap 16 is then inserted between and in engagement with the protrusions 14 of each face panel 10', 10". For example, the splice cap 16 can be slid between the protrusions 14 into the plane of FIG. 6. As shown in FIG. 7, the splice cap 16 has an outer, visible face 20 that is configured to substantially align with and create a smooth transition between the faces 18 of the face panels 10', 10". The splice cap 16 also includes a stem 22 configured to fit into the space between the protrusions 14 of each face panel 10', 10". Finally, the splice cap 16 has a pair of branches 24 configured to fit closely against the right trapezoidal shape of the protrusions 14. In alternative embodiments, the protrusions 14 and splice cap 16 can have different irregular shapes that fit closely with one another. In the embodiment shown, the splice cap 16 is made of PVC; however, other materials providing the same structural and cost-effective qualities could be used.

Figure 8A:
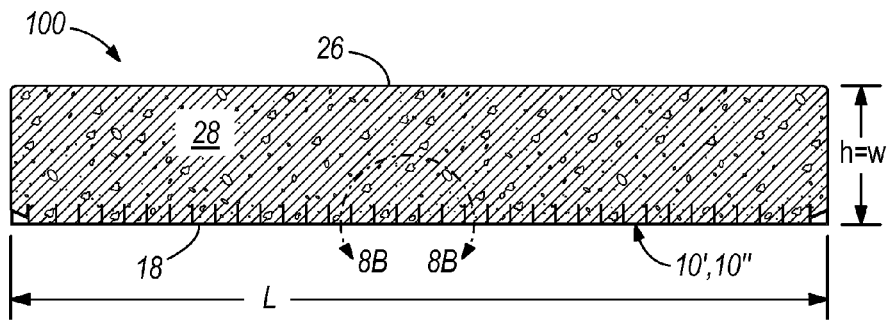
FIG. 8A depicts one embodiment of one of the plastic face panels in a mold with concrete poured on top of the plastic face panel.

During construction of a wall panel, one or more of the face panels 10', 10" are laid on their visible faces 18 in a mold 26, as shown in FIG. 8A. Although only one of the face panels 10' or 10" is shown in FIG. 8A, it is contemplated that two, three, or more face panels could be connected with splice caps 16 and laid in the mold 26 to be covered with concrete. The mold 26 shown in FIG. 8A has a height "h" correspond ma to the desired width of the concrete/plastic wall panel and a length "L" corresponding to a multiple of the length of the face panels 10', 10" depending on how many face panels are connected by splice caps 16 within the mold 26. For example, the length of the mold 26 could be 2 L if two face panels are to be formed into one wall panel 100; the length could be 3 L if three face panels are to be formed into one wall panel 100, and so on.

Figure 8B:
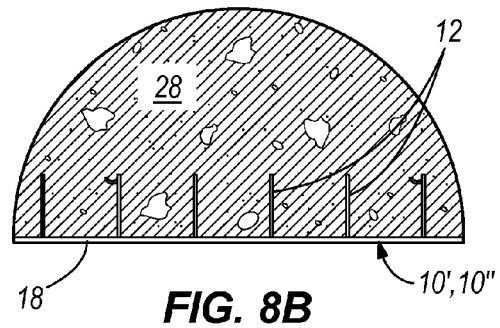
FIG. 8B is a close-up of crosspieces of the plastic face panel surrounded by concrete.

After being laid on their faces 18, the face panels 10', 10", etc, are covered with concrete 28 and the mold 26 is filled to height h, which corresponds to the desired width w of the concrete/plastic wall panel. This width "w" is shown, for example, in FIG. 12. As shown in FIG. 8B, the crosspieces 12 are surrounded by concrete 28 and marry the concrete 28 to the plastic face panels 10', 10" by providing surface area for friction between the plastic crosspieces 12 and the concrete 28. Friction from the crosspieces 12 ensures that the plastic face panels 10', 10" do not pull away from the concrete 28. After the concrete 28 has been poured, the concrete 28 is allowed to harden. Once the concrete 28 had hardened, the mold 26 is removed, and a formed wall panel 100 is ready for transportation to the job site for final, assembly into a structure.

Figure 9:
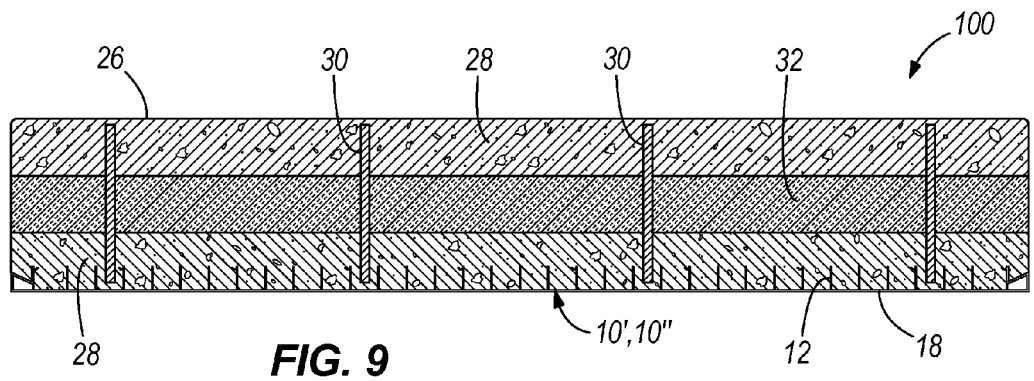
FIG. 9 depicts an alternate embodiment of one of the plastic face panels in a mold with concrete poured on top of the plastic face panel, including a layer of insulation and a reinforcing bar.

FIG. 9 shows an alternate embodiment of the combination plastic and concrete wall panel 100 of the present disclosure. This embodiment includes reinforcing bars 30 and insulation 32. To create the embodiment shown in FIG. 9, the face panels 10', 10" are placed face down such that their visible face 18 is adjacent the bottom of the mold 26. Reinforcing bars 30 are inserted vertically into the mold 26 at desired locations, and concrete 28 is poured into the bottom of the mold. Once this first layer of concrete 28 has hardened, insulation 32 is inserted into the mold. A top layer of concrete 28 is poured on top of the insulation 32. Alternatively, the reinforcing bars 30 are placed in the mold 26 after the first layer of concrete 28 has been poured. Alternatively, the insulation 32 is inserted in the mold 26 before the bottom layer of concrete 28 has hardened. In alternate embodiments, the combination plastic and concrete wall panel includes only the reinforcing bars 30 or the insulation 32. Once the concrete 28 has set, the formed wall panel 100 is ready for transportation to the job site for final assembly into structure.

Figure 10:
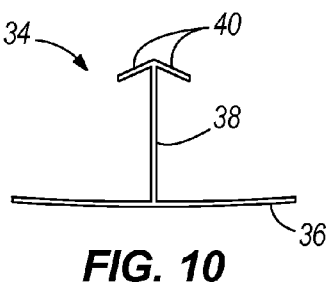
FIG. 10 depicts a close-up of an expansion joint.
Figure 11:
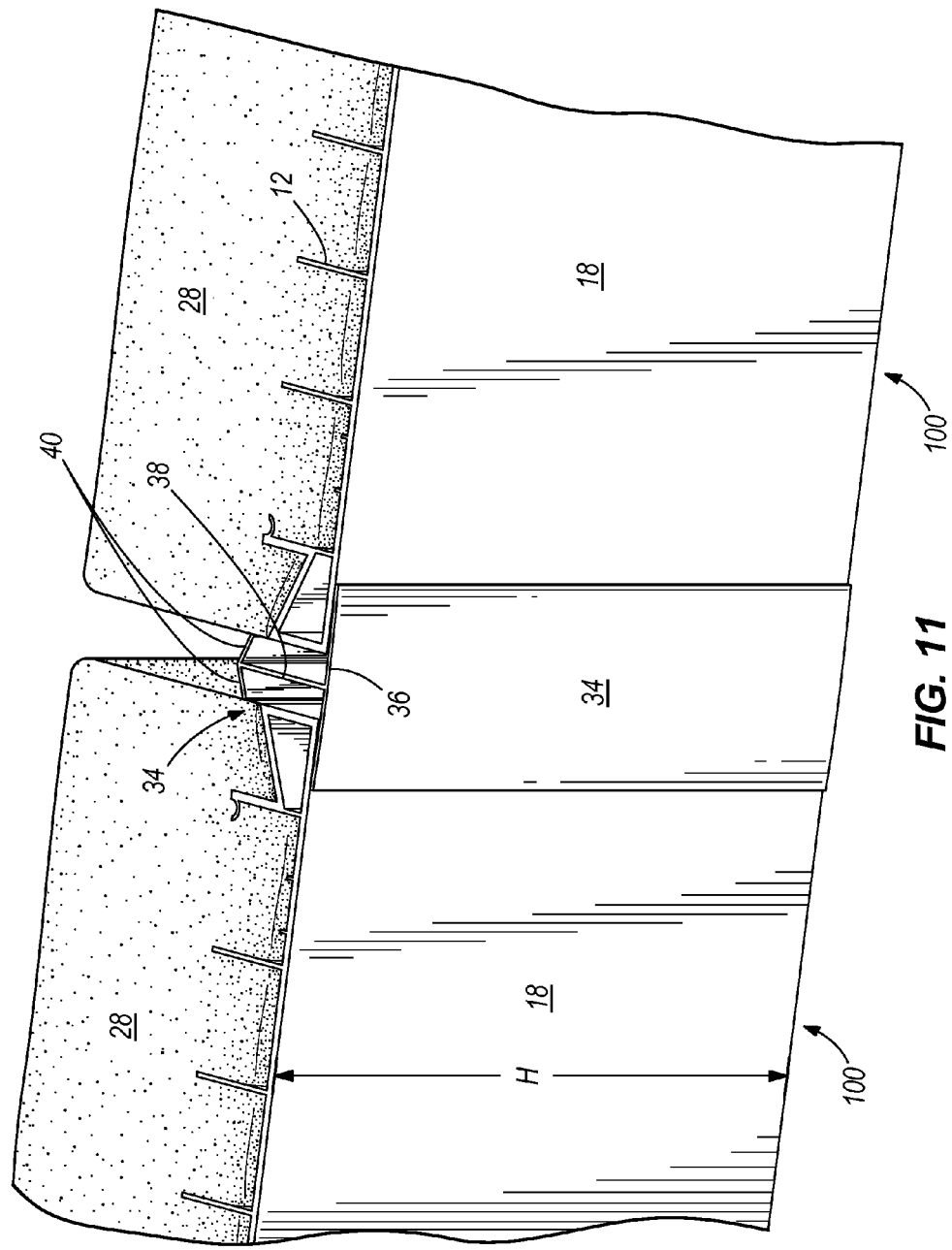
FIG. 11 depicts the expansion joint of FIG. 10 as used between two concrete/plastic wall panels.

If it is desired to place one or more formed concrete/plastic wall panels 100 next to one another on the job site, an expansion joint cover 34, as shown in FIG. 10, may be used. The expansion joint cover 34 has a visible face 36, a stem 38, and branches 40. Preferably, the branches 40 are not as long, as the branches 24 of the splice cap 16. The expansion joint cover 36 can be inserted between two formed concrete/plastic wall panels 100, as shown in FIG. 11. The expansion joint cover 36 can be slid vertically downward between the two formed panels 100 or snapped transversely between the two panels 100, depending on the width of the branches 40. The expansion joint cover 36 allows for the concrete 28 in each formed panel 100 to expand and contract as the concrete 28 heats and cools due to environmental temperature changes. The expansion joint cover 36 is held in place by friction between two formed panels 100.

A formed concrete/plastic wall panel 100 formed according to the method described above is shown in FIG. 12. The wall panel 100 comprises two plastic face panels 10', 10" connected by a splice cap 16 that extends around the pair of spaced protrusions 14. Crosspieces 12 extend into concrete 28 to hold plastic face panels 10', 10" to concrete 28. FIG. 11 illustrates a pair of wall panels 100 positioned adjacent to each other with an expansion joint cover 36 providing a smooth outer surface to cover the gap between the pair of spaced wall panels 100. Each of the wall panels 100 shown in FIG. 11 could be formed from either a single plastic panel or a pair of plastic panels joined to each other, as shown in FIG. 12.

Figure 12:
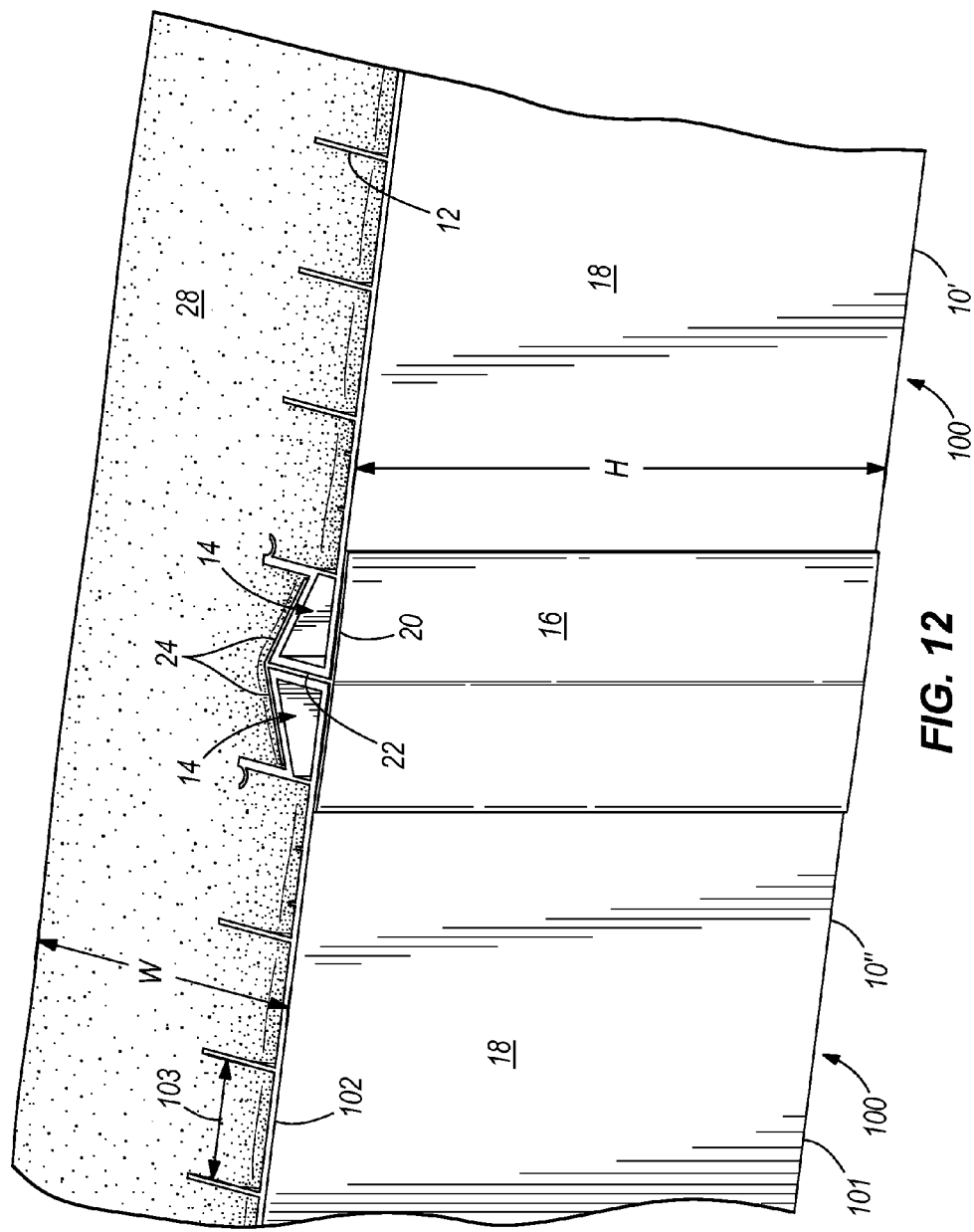
FIG. 12 depicts an embodiment of the disclosure wherein two plastic face panels are joined by a splice cap and concrete is poured over both in the same mold.

As shown in FIGS. 8-12, the methods described above can be used to create a composite wall panel comprising a first plastic face panel 10', the plastic face panel 10' having a front face 18 and a back face 19 and a layer of concrete 28 bonded to and coextensive with the back face 19 of the first plastic face panel 10'. The plastic face panel 10' may have two side edges 15, one or both of the side edges 15 comprising a protrusion 14 extending along its height H. The back face 19 of the first plastic face panel 10' has a plurality of crosspieces 12 extending therefrom. As shown in FIGS. 11 and 12, each crosspiece 12 in the plurality may extend from a bottom edge 101 of the face panel 10' to a top edge 102 of the face panel 10' and may be spaced at an interval 103 from adjacent crosspieces 12 in the plurality. In other embodiments, the crosspieces 12 do not extend from the bottom edge 101 to the top edge 102 of the face panel 10'. In other embodiments, the crosspieces 12 are not spaced at a regular interval 103 from one another, but are spaced at varying intervals from one another.

The concrete 28 is bonded to the first plastic face panel 10' by frictional engagement with the plurality of crosspieces 12. In one embodiment, the wall panel further comprises reinforcing bars 30 within the layer of concrete 28. In another embodiment, the wall panel further comprises a layer of insulation 32 between two layers of concrete 28. The wall panel may farther comprise a second plastic face panel 10" connected to the first plastic face panel 10', the second plastic face panel 10" having a front face 18 and a back face 19 and two side edges 15, one or both of which comprises a protrusion 14 extending along its height h, wherein the side edges 15 of the first panel 10' and second panel 10" are situated adjacent one another such that the protrusions 14 are also adjacent one another. The concrete 28 is bonded to and is coextensive with the back faces 19 of both the first 10' and second 10" plastic face panels.

The wall panel may further comprise a splice cap 16 connecting the side edges 15 of the first 10' and second 10" face panels. The splice cap 16 is shaped to fit over the adjacent protrusions 14 on both the first 10' and second 10" face panels. As shown in FIG. 2A, the protrusions 14 on each face panel 10', 10" have the shape of a right trapezoid having a base 17 integral with the front face 18 of the face panel 10' or 10", two parallel sides 19 at right angles to the front face 18 of the face panel 10' or 10", and an angled side 21 opposite the base 19 and extending between the two parallel sides 19. The splice cap 16 is configured to fit over the protrusions 14 on two adjacent face panels 10', 10". The splice cap 16 comprises a stem 22 that extends between the side edges 15 of the face panels. The splice cap has branches 24 at a back end of the stem 22 that extend from either side of the stem 22 at angles that parallel the angled sides 21 of the protrusions 14. The splice cap 16 also has a visible face 20 at a front end of the stem that extends perpendicularly on either side of the stem and that lies along substantially the same plane as the front faces 18 of the face panels 10', 10" to create a smooth transition between the front faces 18 of the face panels 10', 10".

The materials used with these methods are not limited to those described above. Rather, the above methods can be used to form a variably sized wall panel by supplying a face panel 10' of a first material, the face panel 10' having a front face 18 and a back face 19, the back face 19 having a plurality of crosspieces 12 extending therefrom. The method includes placing the face panel 10' in a mold 26 such that the front face 18 of the face panel 10' abuts a bottom of the mold 26 and the hack face 19 of the face panel 10' faces away from the bottom of the mold 26. The method further includes layering a flowable second material 28 on top of the face panel 10' and allowing the flowable second material 28 to harden such that the back face 19 of the face panel 10' and the crosspieces 12 are frictionally bound to the hardened second material 28. The method may include supplying one or more additional face panels 10" of the first material adjacent the first face panel 10' and connecting the one or more additional face panels 10" to the first face panel 10' prior to layering the flowable second material 28 on top of the connected face panels 10', 10". The method may further include supplying one or more splice caps 16, wherein connecting the one or more additional face panels 10" to the first face panel 10' comprises inserting a splice cap 16 between each of the adjacent face panels 10', 10".

What is claimed is:

1. A composite wall panel comprising:
    a first plastic face panel, the first plastic face panel having a front face and a back face; and
    a layer of concrete having a front face bonded to and coextensive with the back face of the first plastic face panel;
    wherein the first plastic face panel has a length extending between two side edges, one or both of the side edges comprising a protrusion extending along its height;
    wherein the back face of the first plastic face panel has a plurality of crosspieces spaced along the length of the first plastic panel and extending therefrom in addition to the protrusion on one or both of the side edges; and
    wherein the concrete is bonded to the first plastic face panel by frictional engagement with the plurality of crosspieces such that the plurality of crosspieces prevent separation between the first plastic face panel and the layer of concrete and such that the wall panel is structurally sound, each without requiring support on an opposite, back face of the layer of concrete.

2. The composite wall panel according to claim 1, further comprising reinforcing bars within the layer of concrete.

3. The composite wall panel according to claim 1, further comprising a layer of insulation between two layers of concrete.

4. The composite wall panel of claim 1, wherein each crosspiece in the plurality extends from a bottom edge of the face panel to a top edge of the face panel and is spaced at an interval from adjacent crosspieces in the plurality.

5. The composite wall panel according to claim 1, further comprising a second plastic face panel connected to the first plastic face panel, the second plastic face panel having a front face and a back face and two side edges, one or both of which comprises a protrusion extending along its height, wherein the side edges of the first and second face panels are situated adjacent one another such that the protrusions are also adjacent one another.

6. The composite wall panel according to claim 5, wherein the concrete is bonded to and is coextensive with the back faces of both the first and second plastic face panels.

\* \* \* \* \*